United States Patent
Kutsukake

(12) 
(10) Patent No.: US 6,490,851 B2
(45) Date of Patent: Dec. 10, 2002

(54) HOUSING STRUCTURE FOR LAWN MOWER

(75) Inventor: Mitsuhiro Kutsukake, Wako (JP)

(73) Assignee: Honda Hiken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/941,129

(22) Filed: Aug. 28, 2001

(65) Prior Publication Data

US 2002/0023421 A1 Feb. 28, 2002

(30) Foreign Application Priority Data

Aug. 31, 2000 (JP) ...................................... 2000-264397

(51) Int. Cl.⁷ .............................................. A01D 34/70
(52) U.S. Cl. ...................................... 56/320.1; 56/202
(58) Field of Search ............................... 56/10.5, 13.4, 56/16.6, 16.7, 16.9, 17.5, 320.1, 320.2, 202–206

(56) References Cited

U.S. PATENT DOCUMENTS

| | | | |
|---|---|---|---|
| 4,800,712 A | 1/1989 | Morse et al. | 56/16.6 |
| 4,843,805 A | 7/1989 | Satoh | 56/16.6 |
| 4,897,988 A | 2/1990 | Schweitz et al. | 56/17.4 |
| 4,930,300 A | 6/1990 | Benter et al. | 248/302 |
| 5,033,258 A | 7/1991 | Morse | 383/16 |
| 5,195,311 A | 3/1993 | Holland | 56/202 |
| 5,435,118 A | 7/1995 | Cobile | 56/13.4 |
| 6,018,937 A | 2/2000 | Shimada et al. | 56/10.5 |

FOREIGN PATENT DOCUMENTS

| | | |
|---|---|---|
| JP | 63061223 | 4/1988 |
| JP | 01218509 | 8/1989 |

Primary Examiner—Robert E. Pezzuto
(74) Attorney, Agent, or Firm—Adams & Wilks

(57) ABSTRACT

In a housing structure for a lawn mower, a rear scroll guide member is provided adjacent and along the width of an entrance of a cut-grass discharge passage, and this rear scroll guide member has upper and lower flanges together defining a channel-shaped concave portion for insertion and retention therein of a front end portion of a bottom plate that closes the bottom of the cut-grass discharge passage. Back plate is provided adjacent and along the width of an exit of the cut-grass discharge passage, and this back plate has a locking hole. The bottom plate has, on its rear end portion, a projection for fitting engagement with the locking hole of the back plate. Thus, the bottom plate is secured to the body of the housing with the front end portion inserted in the concave portion of the rear scroll guide member and the projection on the rear end portion fitted in the locking hole of the back plate. Such arrangements can facilitate the mounting of the bottom plate and thus can reduce the overall cost of the housing.

3 Claims, 15 Drawing Sheets

HOUSING STRUCTURE FOR LAWN MOWER

BACKGROUND OF THE INVENTION

1. Field of the Invention:

The present invention relates to an improved housing structure for use in lawn mowers of a type which includes a cut-grass discharge passage extending from a cutter blade housing for discharging the cut grass from the cutter blade housing and a separate or discrete bottom plate closing the bottom of the cut-grass discharge passage.

2. Description of the Related Art:

Housing structures for lawn mowers are known, for example, from Japanese Utility Model Laid-open Publication No. SHO-63-61223 and Japanese Patent Laid-open Publication No. HEI-1-218509 which both disclose so-called walking-type lawn mowers. More specifically, Japanese Utility Model Laid-open Publication No. SHO-63-61223 shows that a bottom plate of a cut-grass discharge passage is secured to a cutter blade housing by means of screws, and Japanese Patent Laid-open Publication No. HEI-1-218509 shows that the cut-grass discharge passage has a relatively great level difference on the upper or inner surface of the bottom plate at a portion near an exit (i.e., cut-grass discharge opening) of the passage.

However, with the walking-type lawn mower disclosed in the above-mentioned Japanese utility model laid-open publication, relatively troublesome and difficult operations are required for screwing the bottom plate to the cutter blade housing. If any one of the screws to be used for screwing the bottom plate is lost, the bottom plate can not be properly secured to the cutter blade housing, and thus management of parts has to be performed in an appropriate manner. Further, with the walking-type lawn mower disclosed in the above-mentioned Japanese patent laid-open publication, the level difference on the bottom plate near the cut-grass discharge opening would collide with the cut grass and thereby considerably hinder the cut grass from being discharged smoothly through the discharge passage.

SUMMARY OF THE INVENTION

It is accordingly an object of the present invention to provide a housing structure for a lawn mower which can greatly facilitate mounting of a bottom plate of a cut-grass discharge passage and also allows the cut grass to be smoothly discharged through the cut-grass discharge passage without being hindered by the bottom plate.

In order to accomplish the above-mentioned object, the present invention provides an improved housing structure for use in a lawn mower, which comprises: a cut-grass discharge passage for discharging cut grass from a cutter blade housing accommodating a cutter blade, the cut-grass discharge passage having a bottom closed with a discrete bottom plate; a bridge member disposed adjacent and along a width of an entrance of the cut-grass discharge passage and having a concave portion for insertion and retention therein of a front end portion of the bottom plate, the concave portion being defined by upper and lower flanges of the bridge member; and a back plate disposed adjacent and along a width of an exit of the cut-grass discharge passage and having a locking recess or hole, the bottom plate having, on a rear end portion thereof, a projection for fitting engagement with the locking recess or hole of the back plate. In the present invention, the bottom plate is secured to the body of the housing with the front end portion inserted in the concave portion of the bridge member and the projection on the rear end portion fitted in the locking recess or hole of the back plate.

As with the conventional lawn mowers, the cut-grass discharge passage is provided, in the inventive housing structure, for discharging the cut grass cut from the cutter blade housing accommodating the cutter blade, and the bottom of this cut-grass discharge passage is closed with the discrete bottom plate. For mounting the bottom plate, the bridge member is provided adjacent and along the horizontal width of the entrance of the cut-grass discharge passage, and this bridge member has upper and lower flanges together defining a channel-shaped concave portion for insertion and retention therein of the front end portion of the bottom plate. The back plate having the locking hole is provided adjacent and along the horizontal width of the exit of the cut-grass discharge passage. On the rear end portion of the bottom plate, there is formed the projection for fitting engagement with the locking hole of the back plate. In this invention, the bottom plate is secured to the body of the housing with the front end portion inserted in the concave portion of the bridge member and the projection on the rear end portion fitted in the locking hole of the back plate. Such arrangements can greatly facilitate the mounting of the bottom plate and thus can reduce the overall cost of the housing.

In one embodiment of the present invention, the front end portion of the bottom plate has a depressed surface area for reception and retention therein of the upper flange of the bridge member in such a manner that the upper surface of the upper flange received in the depressed surface area lies flush with the upper surface of the bottom plate other than the depressed surface area. When the bottom plate is mounted to the body of the housing, the upper surfaces of the upper flange of the bridge member and the bottom plate lie flush with each other with no level difference therebetween that would collide with and thus prevent the cut grass from being discharged smoothly, so that appropriate and smooth discharge of the cut grass through the discharge passage can be achieved by the present invention.

In one embodiment of the present invention, the housing has an upper rear end recess formed by recessing at least an upper rear end edge of a portion of the housing that extends as an extension of a ceiling portion of the cut-grass discharge passage, and an upper rear end edge region of the ceiling portion adjacent the upper rear end recess is formed as a reinforcing bent portion of a dogleg sectional shape in order to reinforce the thus-recessed upper rear end edge of the housing. The upper rear end recess, thus formed by recessing at least the upper rear end edge of a portion of the housing, allows the cut grass to be discharged smoothly without hitting the above-mentioned upper rear end edge of the housing. Further, the upper rear edge region of the ceiling portion adjacent the upper rear end recess is formed as the reinforcing bent portion that serves to reinforce the thus-recessed upper rear end edge of the housing. Thus, the present invention permits smooth discharge of the cut grass while still maintaining the necessary mechanical strength of the housing.

BRIEF DESCRIPTION OF THE DRAWINGS

Certain preferred embodiments of the present invention will be described in greater detail, by way of example only, with reference to the accompanying sheets of drawings, in which.

DETAILED DESCRIPTION OF THE PREFERRED EMBODIMENTS

Figure 1:
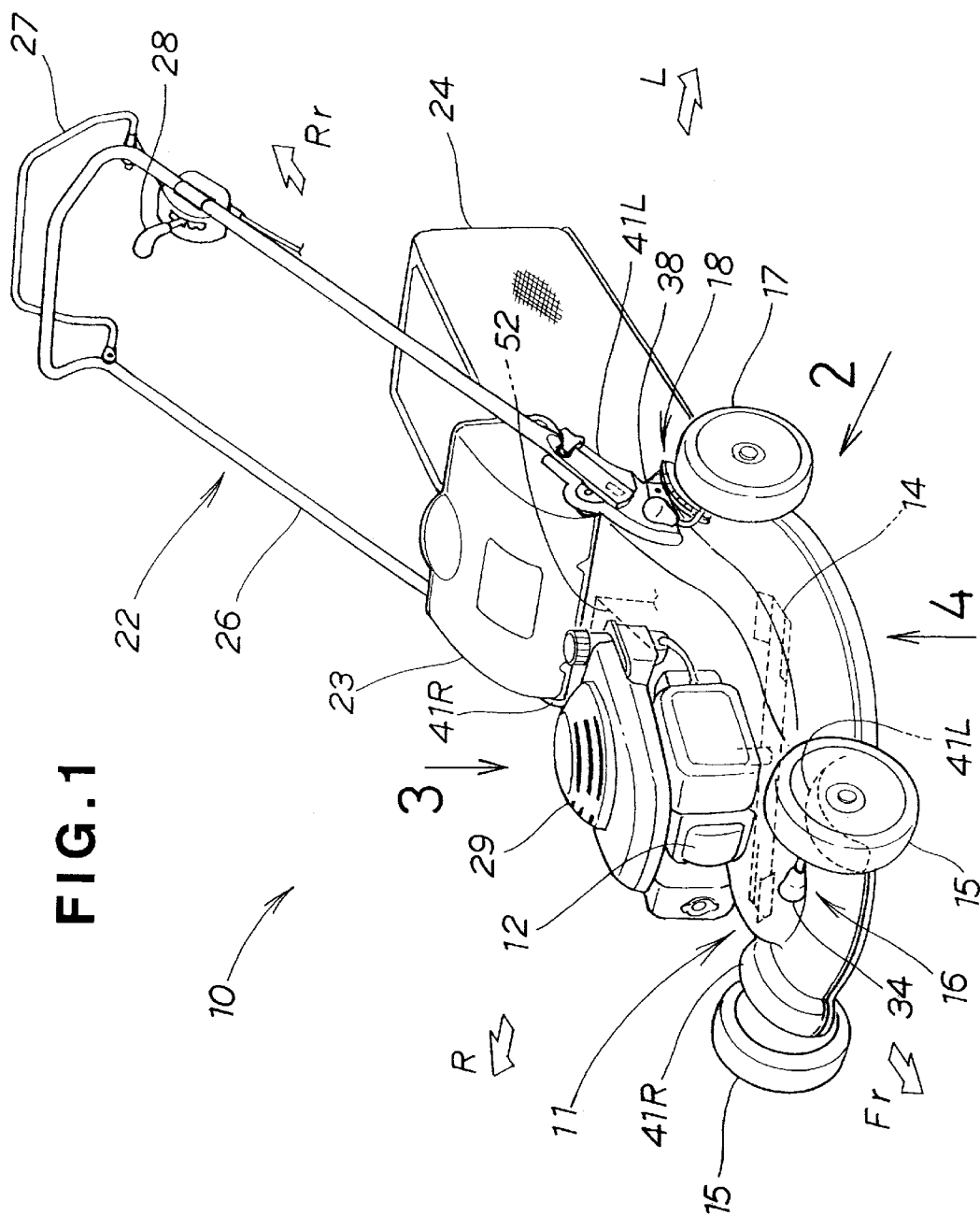
FIG. 1 a perspective view showing an overall external appearance of a lawn mower employing a housing structure in accordance with an embodiment of the present invention.

In the following description, the terms "front", "rear", "left", "right", "upper" and "lower" represent directions as viewed from a human operator of the lawn mower. Also note that reference characters "Fr" and "Rr" denote "forward" (i.e., toward the front of the lawn mower) and "rearward" (i.e., toward the rear of the lawn mower), respectively, and "L" and "R" represent leftward and rightward, respectively.

FIG. 1 is a perspective view showing an overall external appearance of the lawn mower with a housing structure in accordance with an embodiment of the present invention. As shown, the lawn mower 10 includes a housing 11, an engine 12, a cutter blade 14, front wheels 15, a front height adjustment mechanism 16, rear wheels 17, a rear height adjustment mechanism 18, an operating handle 22 having left and right handle portions, a housing cover 23, a grass bag 24, a cutter lever 27, a speed varying lever 28, and a head cover 29. Namely, this lawn mower 10 is constructed as a self-propelled lawn mower where the engine 12 functions to not only rotate the cutter blade 14 but also drive the rear wheels 17. The housing structure of the lawn mower 10 includes a cut-grass discharge passage 52 provided within a rear interior section of the housing 11, and various elements peripheral to the cut-grass discharge passage 52, as will be detailed hereinbelow.

Figure 2:
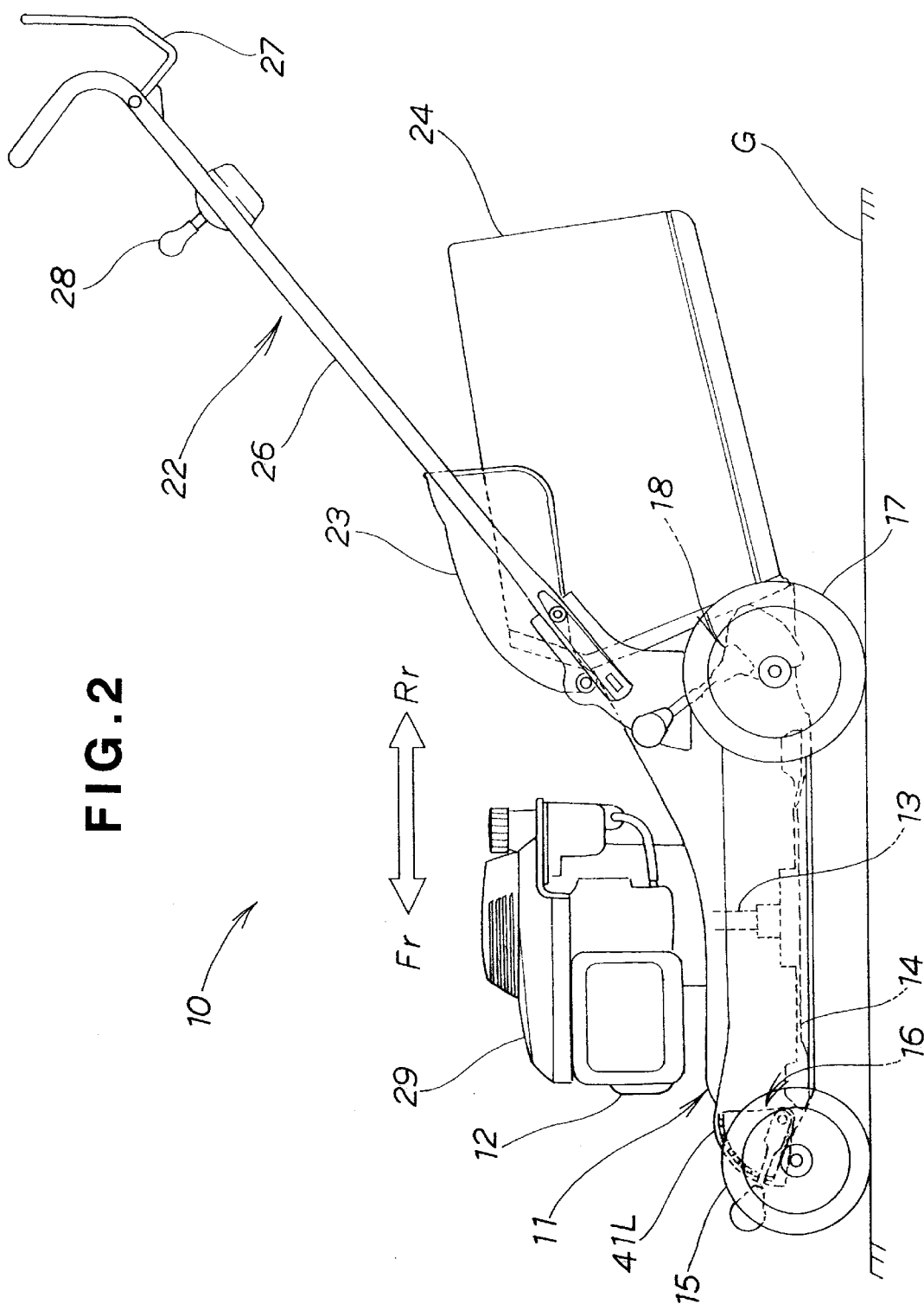
FIG. 2 is a view of the lawn mower taken in a direction of arrow 2 of FIG. 1.

FIG. 2 is a view of the lawn mower 10 taken in a direction of arrow 2 of FIG. 1. In this lawn mower 10, the engine 12 is mounted on the housing 11, and the cutter blade 14 is operatively coupled to a rotation shaft 13 that is driven by the engine 12. The front wheels 15 are attached to the housing 11 for rotation and upward/downward movement relative to the housing 11, and the front height adjustment mechanism 16 is also attached to the housing 11 for adjusting the height of the front wheels 15. Similarly, the rear wheels 17 are attached to the housing 11 for rotation and upward/downward movement relative to the housing 11, and the rear height adjustment mechanism 18 is also attached to the housing 11 for adjusting the height of the rear wheels 17. Desired distance from the ground G to the cutter blade 14 and hence a desired grass-cutting height of the lawn mower 10 can be set or adjusted, by adjusting the height of either or both of the front and rear wheels 15, 17 via either or both of the front and rear height adjustment mechanisms 16 and 18.

The lawn mower 10 can be caused to operate in a self-propelled manner by transmitting the rotation of the engine 12 to the rear wheels 17 via a transmission or speed varying mechanism (not shown).

The operating handle 22 is connected to a rear end portion of the housing 11, and the housing cover 23 is pivotally attached to a rear portion of the housing 11, as will be later described in detail. Further, the grass bag 24 for receiving and storing the cut grass is removably attached to the rear of the housing 11 and extends rearward from the housing 11.

The operating handle 22 includes a handle body 26 having the left and right handle portions, and an engine activating cable (not shown), cutter lever 27 and speed varying level mounted on the handle body 26. The lawn mower 10 can be activated to operate in a self-propelled manner by the human operator first pulling the not-shown engine activating cable, causing the cutter lever 27 to pivot upward to thereby start rotation of the cutter blade 14 and then setting the cutter lever 27 to an advancing position.

Figure 3:
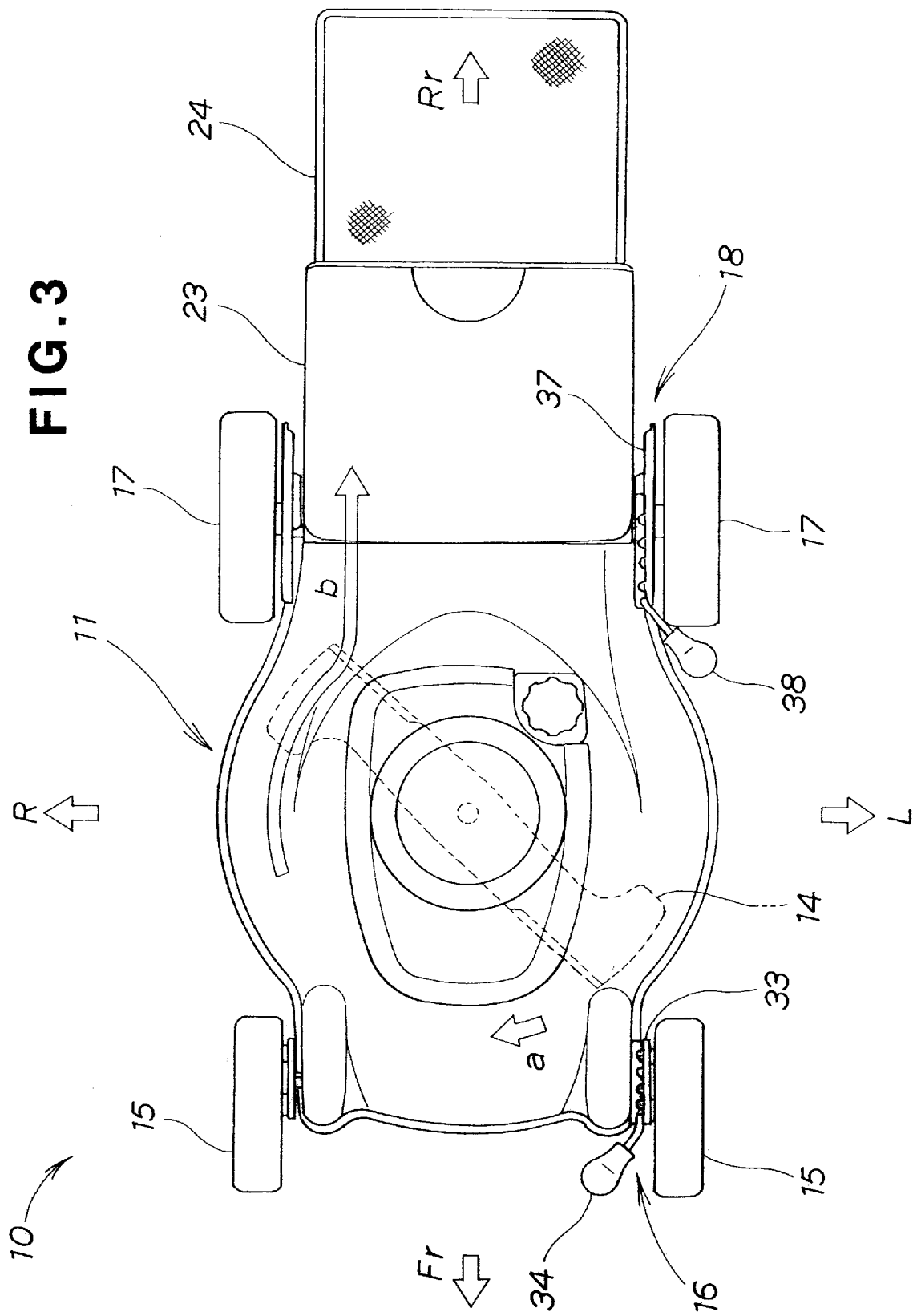
FIG. 3 is a plan view of the lawn mower taken in a direction of arrow 3 of FIG. 1.

FIG. 3 is a plan view of the self-propelled lawn mower 10 taken in a direction of arrow 3 of FIG. 1. The grass cutting height of the lawn mower 10 can be adjusted as desired by the human operator adjusting the heights of the front and rear wheels 15 and 17 by means of the front and rear height adjustment mechanisms 16 and 18, as noted above, and the cutter blade 14 can cut the grass with the grass cutting height by being rotated as denoted by arrow "a". The thus-rotated cutter blade 14 produces a vortical current as denoted by arrow "b", which can force the cut grass into the grass bag 24. The grass cutting operations can progress as the lawn mower 10 is self-propelled in the forward direction denoted by arrow "Fr".

Figure 4:
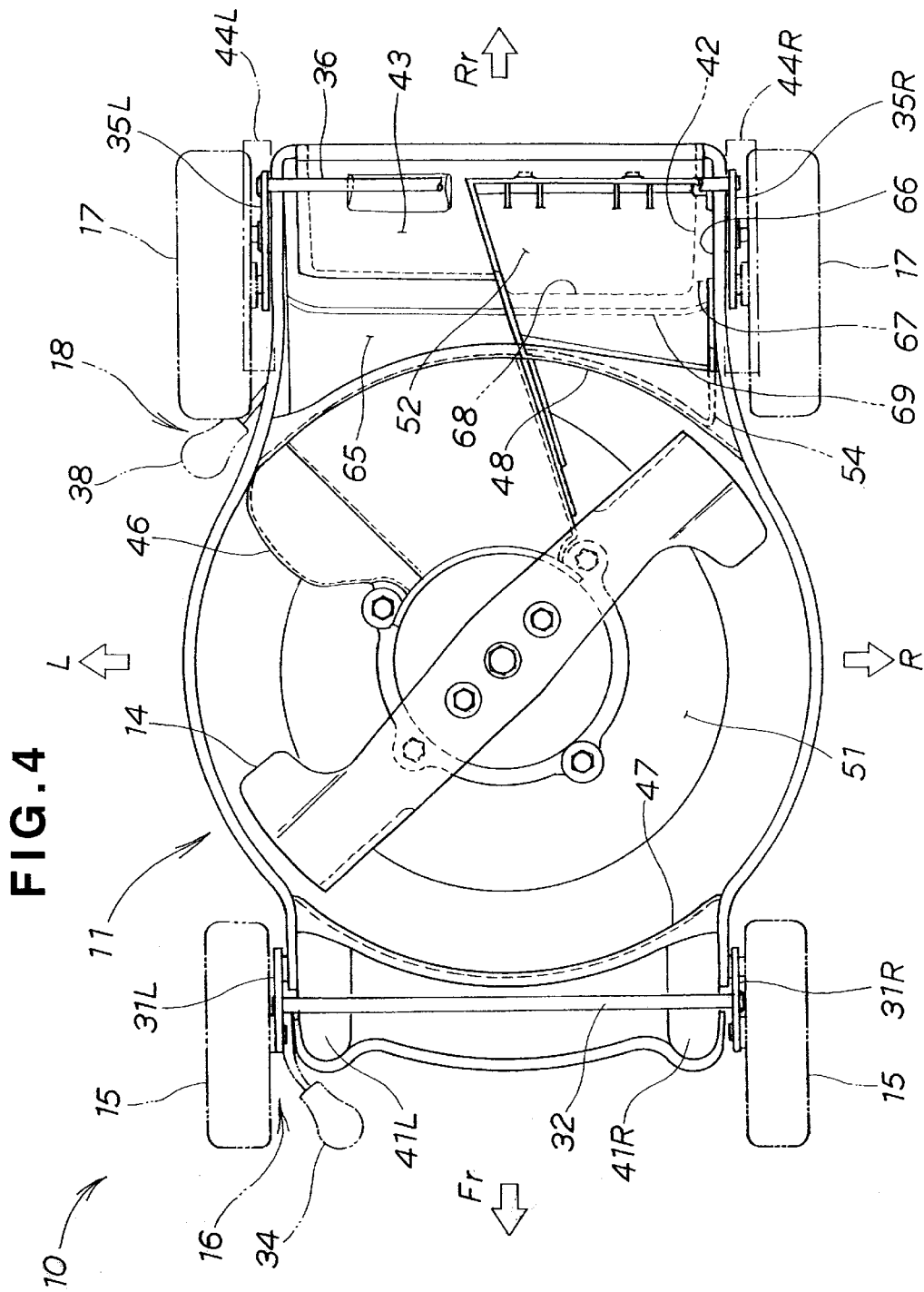
FIG. 4 is a bottom end view of the lawn mower taken in a direction of arrow 4 of FIG. 1.

FIG. 4 is a bottom end view of the self-propelled lawn mower 10 taken in a direction of arrow 4 of FIG. 1. The housing 11, which is preferably made of stamped metal, includes a front left bulge 41L serving to prevent undesired deformation of an adjusting plate 33 (FIG. 3) of the front height adjustment mechanism 16, and a back plate 43 defining an exit or cut-grass discharge opening 42 of the cut-grass discharge passage 52. The housing 11 also includes left and right handle stays 44L and 44R to which the left and right handle portions of the operating handle 22 of FIG. 2 are fixed, a scroll plate 46 attached to the ceiling of the housing 11 to close part of the rear of the housing 11, a front scroll guide member 47 attached to a front interior section of the housing 11 to surround part of a rotating path of the outer ends of the cutter blade 14, and a rear scroll guide member 48 attached to a rear interior section of the housing 11 to surround part of the rotating path of the outer ends of the cutter blade 14 in opposed relation to the front scroll guide member 47. The housing 11 further includes a cutter blade housing 51 formed by the above-mentioned scroll plate 46 and front and rear scroll guide members 47 and 48, and the cut-grass discharge passage 52 extending rearward from the cutter blade housing 51.

The housing 11 further includes a front right bulge 41R opposed to the front left bulge 41L and having the same shape as the front left bulge 41L. Further, in FIG. 4, reference numeral 65 represents a rear ceiling portion of the housing 11, 66 a rear right side wall of the housing 11, 67 an open frame portion formed on the housing 11, 68 an upper rear end recess formed in the housing 11, and 69 a reinforcing bent portion of the housing 11, as will be later described in detail.

Further, in FIG. 4, reference numerals 31L and 31R represent left and right support members supporting the left and right front wheels 15, and 32 a connector member connecting between the left and right support members 31L and 31R. Reference numerals 35L and 35R represent left and right support members supporting the left and right rear wheels 17, and 6 a connector member connecting between the left and right support members 35L and 35R. Referring back to FIG. 3, the adjusting plate 33 of FIG. 3 is provided for adjusting the height of the front wheels 15, and reference numeral 34 represents a height adjusting lever operable for adjusting the front wheel height. Similarly, an adjusting plate 37 of FIG. 3 is provided for adjusting the height of the rear wheels 17, and reference numeral 38 represents a height adjusting lever operable for adjusting the height of the rear wheels 17.

Figure 5:
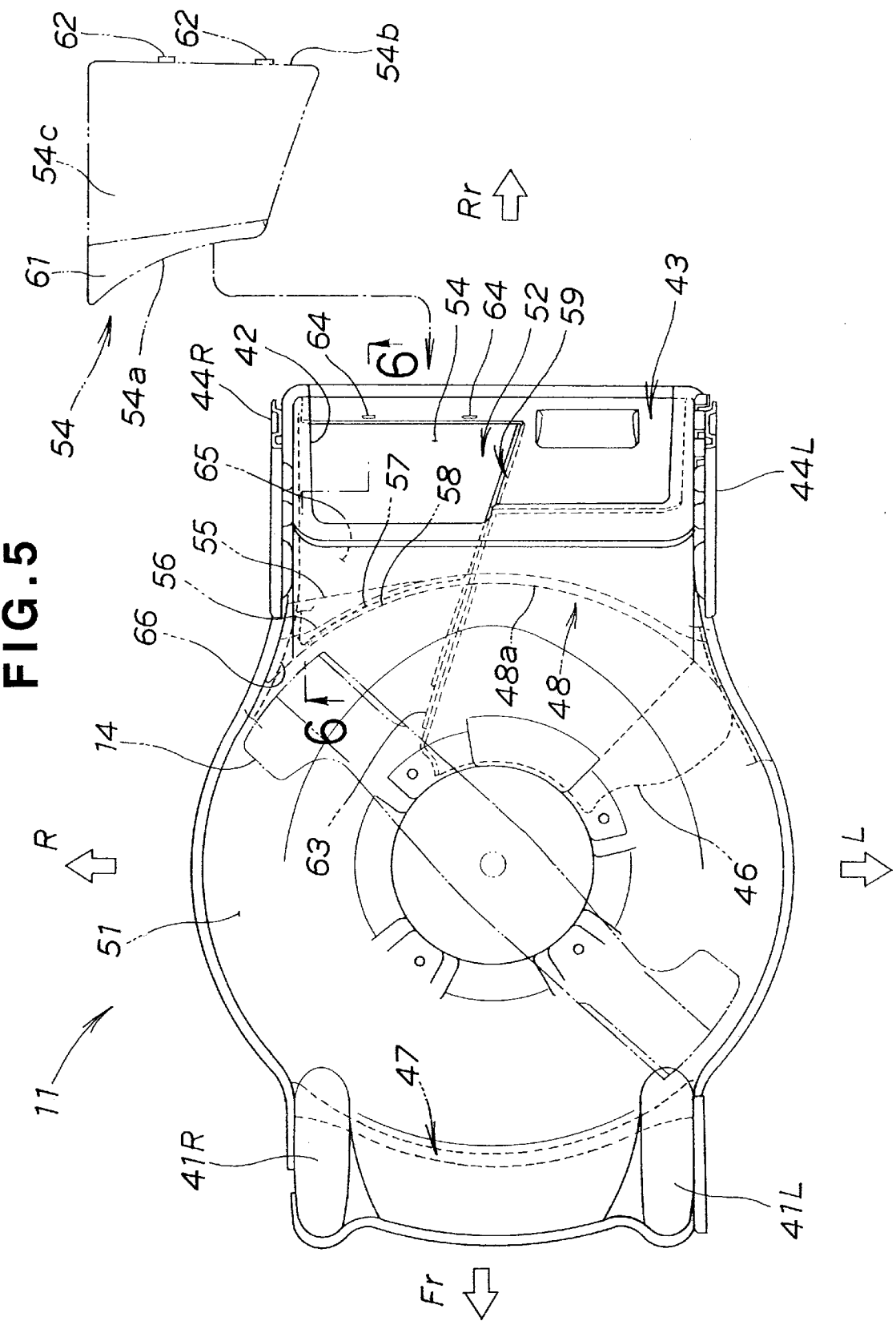
FIG. 5 is a plan view of the housing structure employed in the lawn mower.

FIG. 5 is a plan view of the housing structure employed in the lawn mower 10. The back plate 43 has locking holes 64 for fitting engagement with a portion of a bottom plate 54 that closes the bottom of the cut-grass discharge passage 52, as will be detailed later in relation to FIG. 8. The rear scroll guide member or bridge member 48, which generally has a channel-like sectional shape, includes a base portion 48a and upper and lower flange portions 55 and 56 extending from the base portion 48a to form a channel-shaped concave portion 57 in which a front end portion of the bottom plate 54 is inserted and retained.

The cut-grass discharge passage 52 has a discharge channel 59 constituted by a side plate 63 bent forward from the back plate 43, ceiling portion 65 of the housing 11 and rear right side wall 66 of the housing 11. That is, the cut-grass discharge passage 52 is formed by closing the bottom of the discharge channel 59 with the bottom plate 54. Namely, in the housing structure (i.e., cut-grass discharge passage 52 and other elements associated therewith) of the present invention, the cut-grass discharge passage 52 extends rearward from the cutter blade housing 51 accommodating the cutter blade 14 and is closed at its bottom with the discrete bottom plate 54. Note that reference numeral 58 in FIG. 5 represents an entrance of the cut-grass discharge passage 52 located immediately rearward of the cutter blade housing 51.

Figure 6:
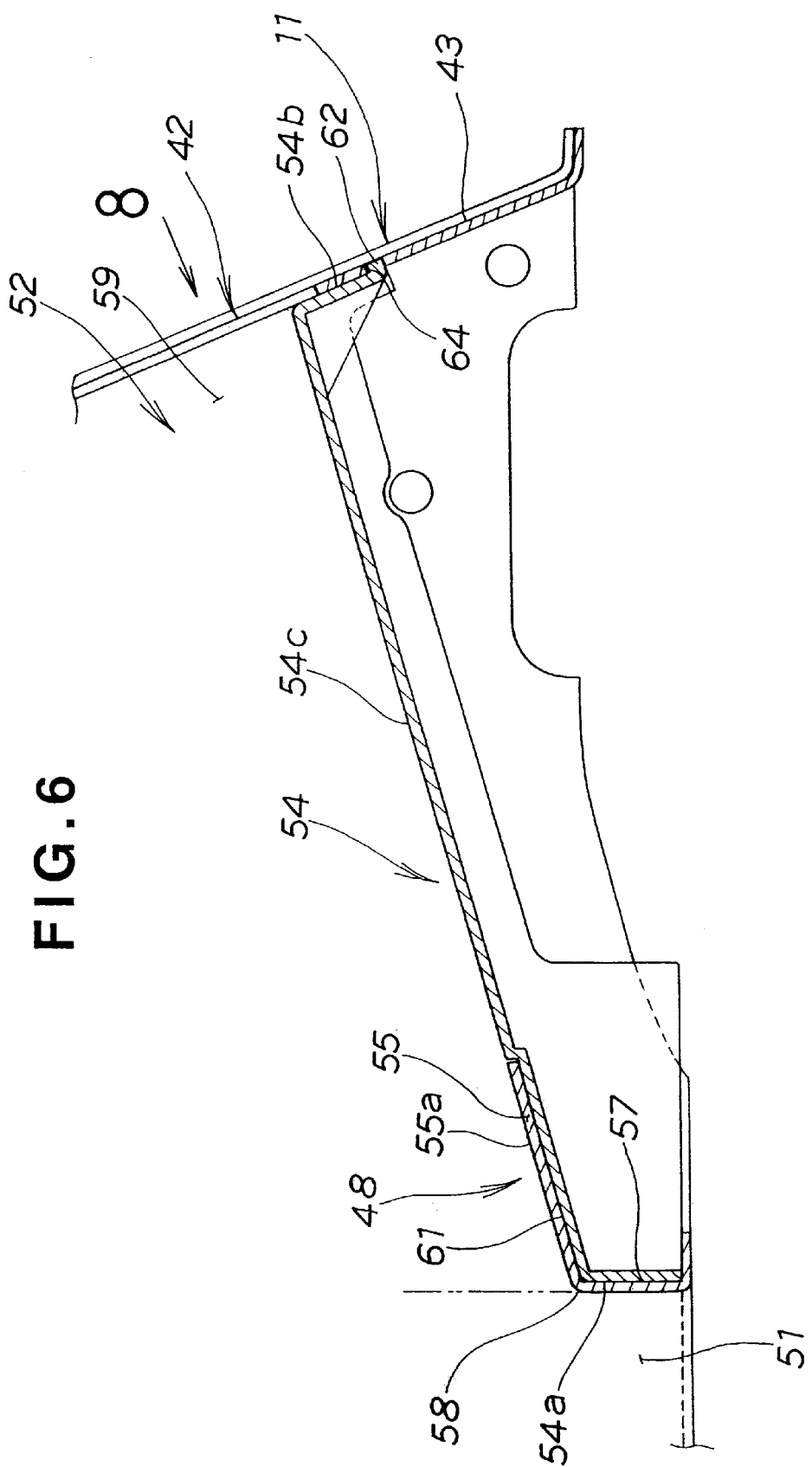
FIG. 6 is a sectional view taken along the 6—6 line of FIG. 5, which particularly shows how a bottom plate is mounted to a body of the housing.

FIG. 6 is a sectional view taken along the 6—6 line of FIG. 5, which particularly shows how the bottom plate 54 is mounted. The bottom plate 54 has the front end portion 54a shaped to conform to the contour of the concave portion 57 of the rear scroll guide member or bridge member 48, and a rear end portion 54b extending straight along the back plate 43. The front end portion 54a of the bottom plate 54 has a depressed surface area 61 in which the upper flange 55 of the rear scroll guide member 48 is received and retained in face-to-face contact with the surface area 61. The rear end portion 54b of the bottom plate 54 has one or more (two in the illustrated example) projections 62 (only one of which is shown in the figure) fitted in the respective locking holes 64 (only one of which is shown in the figure) formed in the back plate 43.

The upper flange 55 of the rear scroll guide member 48 received in the depressed surface area 61 of the bottom plate 54 has an upper surface 55a lying flush with an upper surface 54c of the bottom plate 54 other than the depressed surface area 61. Because the upper surface 55a of the upper flange 55 of the rear scroll guide member 48 is flush with the upper surface 54c of the bottom plate 54 like this, there is not produced a level difference on the upper surface of the bottom of the cut-grass discharge passage 52 that would prevent the cut grass from being discharged through the discharge passage 52, and thus smooth discharge of the cut grass can be achieved here.

Figure 7A:
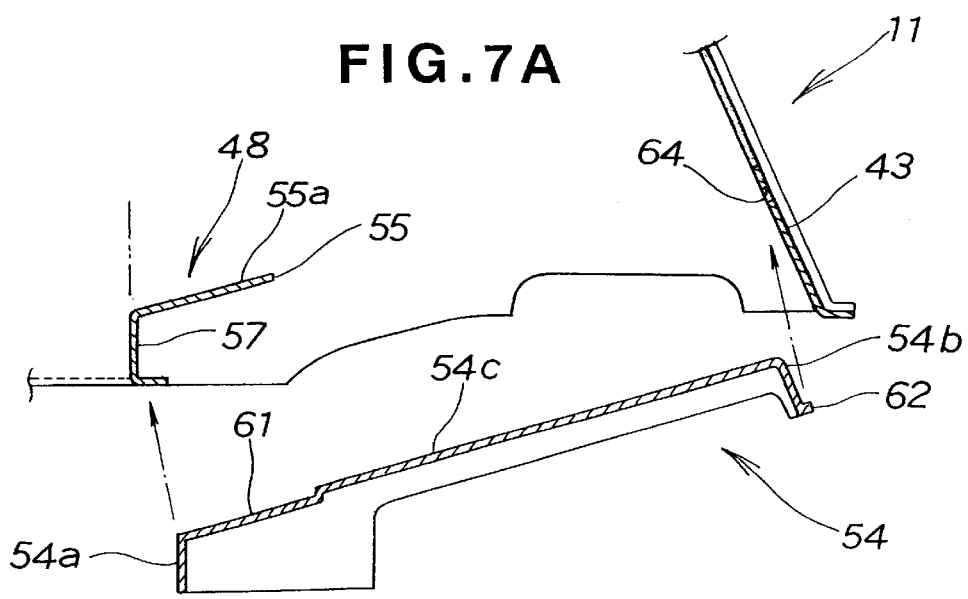
FIGS. 7A to 7C are diagrams explanatory of how the lawn mower housing structure of the present invention is assembled.
Figure 7B:
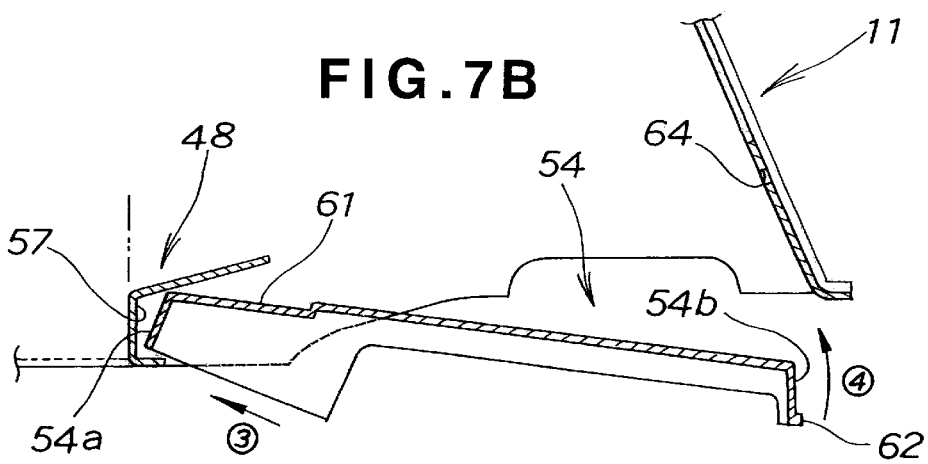
Figure 7C:
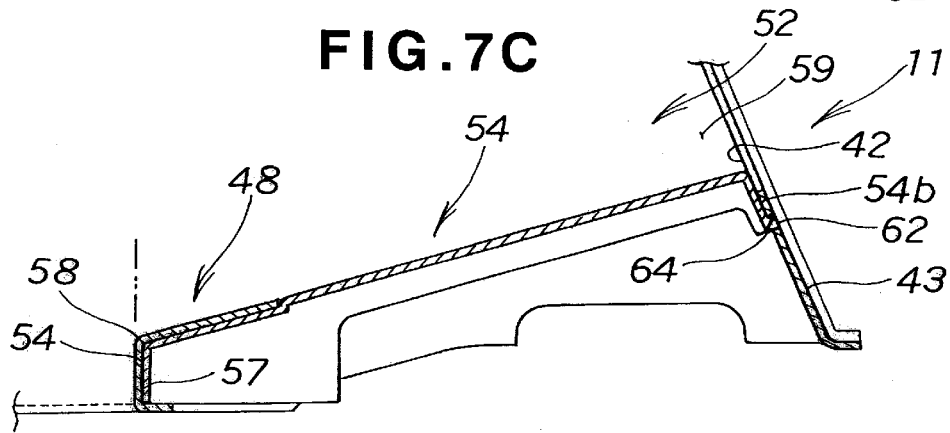

FIGS. 7A to 7C are diagrams explanatory of how the lawn mower housing structure of the present invention is assembled. In assembly, the bottom plate 54 is first placed immediately below the housing 11, as shown in FIG. 7A. Next, the front end portion 54a of the bottom plate 54 is brought into contact with a front inner surface of the rear scroll guide member 48 defining the concave portion 57 as denoted by arrow ③ in FIG. 7B, and the rear end portion 54b of the bottom plate 54 is angularly moved toward the locking holes 64 of the back plate 43 as denoted by arrow ④. Then, as shown in FIG. 7C, the projections 62 of the rear end portion 54b are fitted in the respective locking holes 64 of the back plate 43, and in this way the mounting of the bottom plate 54 to the housing 11 is completed.

As set forth above, the housing structure (i.e., the cut-grass discharge passage 52 and other elements associated therewith) of the present invention includes the rear scroll guide member or bridge member 48 that is disposed adjacent and along the horizontal width of the entrance 58 of the cut-grass discharge passage 52 and has the concave portion 57 for insertion and retention therein of the front end portion 54a of the bottom plate 54, and the back plate 43 that is disposed adjacent and along the horizontal width of the cut-grass discharge opening 42 (i.e., the exit of the cut-grass discharge passage 52) and has the locking holes 64. Further, the rear end portion 54b of the bottom plate 54 has the projections 62 for snap fitting engagement with the locking holes 64. With these arrangements, the bottom plate 54 can be secured, with significantly increased ease, to the body of the housing 11 by just inserting the front end portion 54a of the bottom plate 54 into the concave portion 57 of the bridge member 48 and snap-fitting the projections 62 in the locking holes 64 of the back plate 43. As a consequence, the overall cost of the housing 11 can be reduced considerably.

Figure 8:
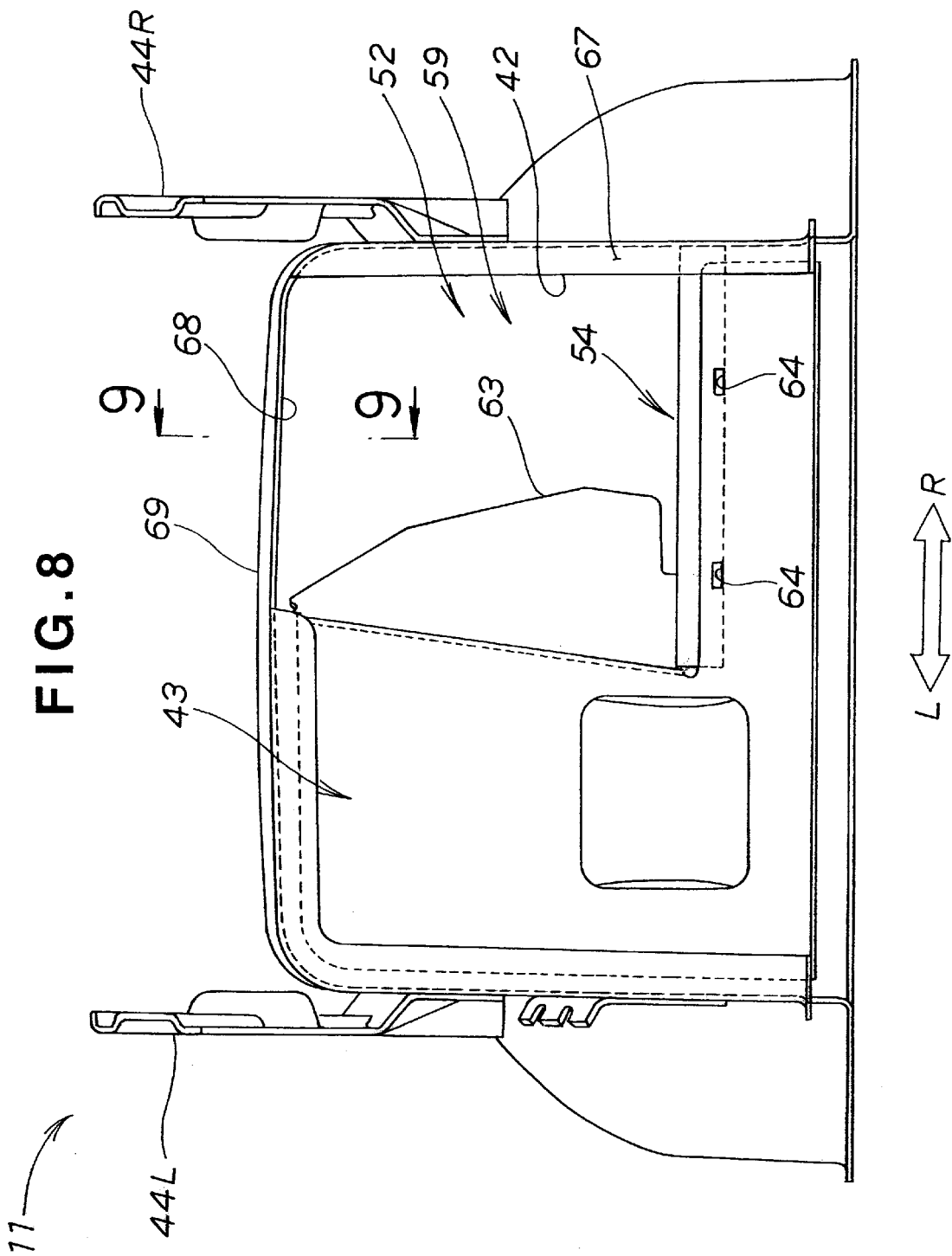
FIG. 8 is a rear end view of the housing taken in a direction of arrow 8 of FIG. 6.

FIG. 8 is a rear end view of the housing 11 taken in a direction of arrow 8 of FIG. 6. As noted above, the back plate 43 has the bent-forward side plate 63 for forming the cut-grass discharge passage 52 (discharge channel 59), and the locking holes 64 for fitting engagement with the bottom plate 54. The upper rear end recess 68 formed in the housing 11 will be described in relation to FIG. 9.

Figure 9:
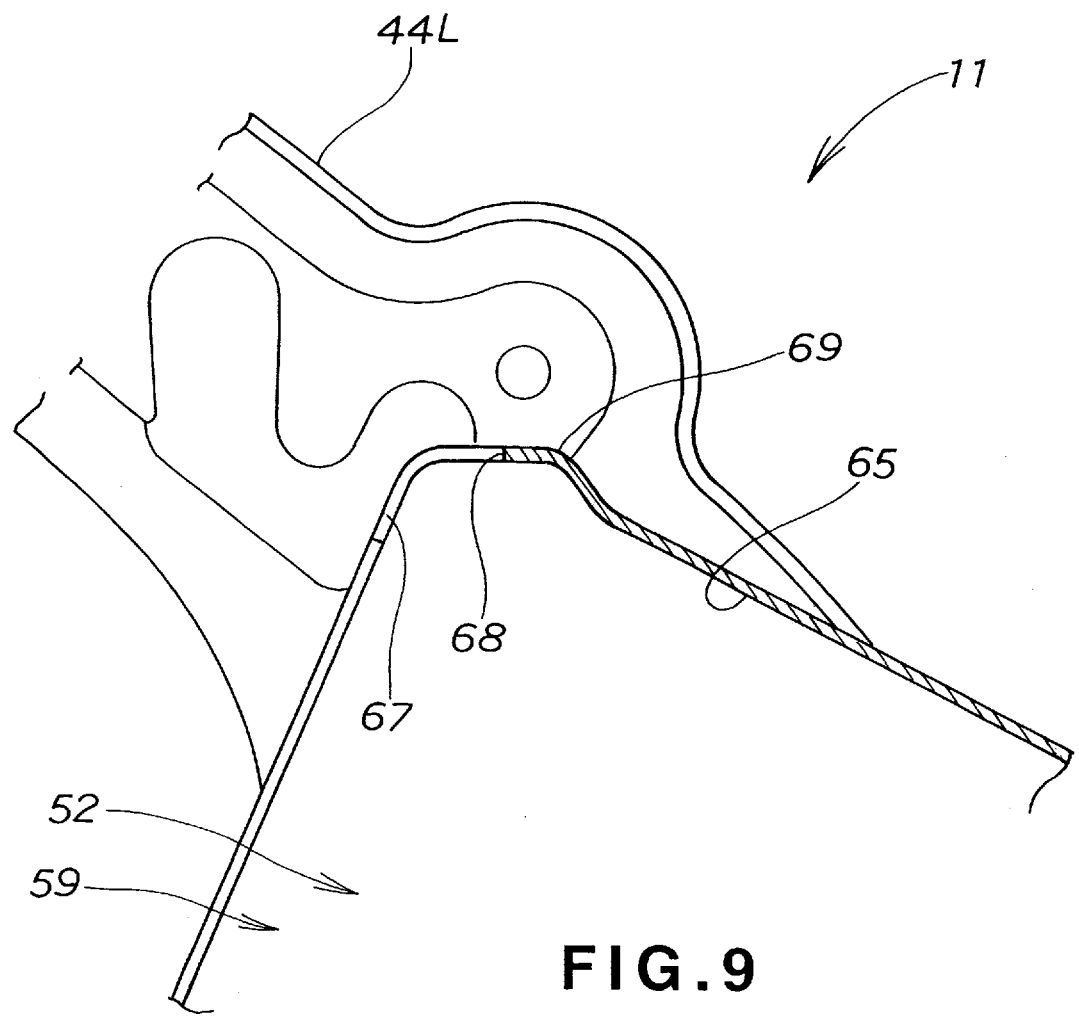
FIG. 9 is a sectional view taken along the 9—9 line of FIG. 8, which shows details of an upper rear end recess in the housing.

FIG. 9 is a sectional view taken along the 9—9 line of FIG. 8, which shows details of the upper rear end recess 68 formed in the housing 11. The upper rear end recess 68 is formed by recessing part of the open frame portion 67 formed on the housing 11. More specifically, the upper rear end recess 68 is formed by recessing at least a portion of the upper rear end edge of the open frame portion 67, extending as an extension of the ceiling portion 65 of the cut-grass discharge passage 52, in such a manner that the upper rear end recess 68 communicates with the cut-grass discharge opening 42 and hence forms an uppermost open region of the discharge opening 42. Upper rear edge region of the ceiling portion 65 is formed as a reinforcing bent portion 69 of a dogleg sectional shape in order to reinforce the thus-recessed upper rear end edge of the open frame portion 67. The upper rear end recess 68 of the open frame portion 67 extending as an extension of the ceiling portion 65 of the cut-grass discharge passage 52 allows the cut grass to be discharged much more smoothly as compared to the conventional art housing structures having no such upper rear end recessed communicating with the cut-grass discharge opening 42, and the necessary mechanical strength of the housing 11 can still be maintained properly by the reinforcing bent portion 69 despite the formation of the upper rear end recess 68. Such novel arrangements permit smooth discharge of the cut grass while still maintaining the necessary mechanical strength of the housing 10.

Figure 10A:
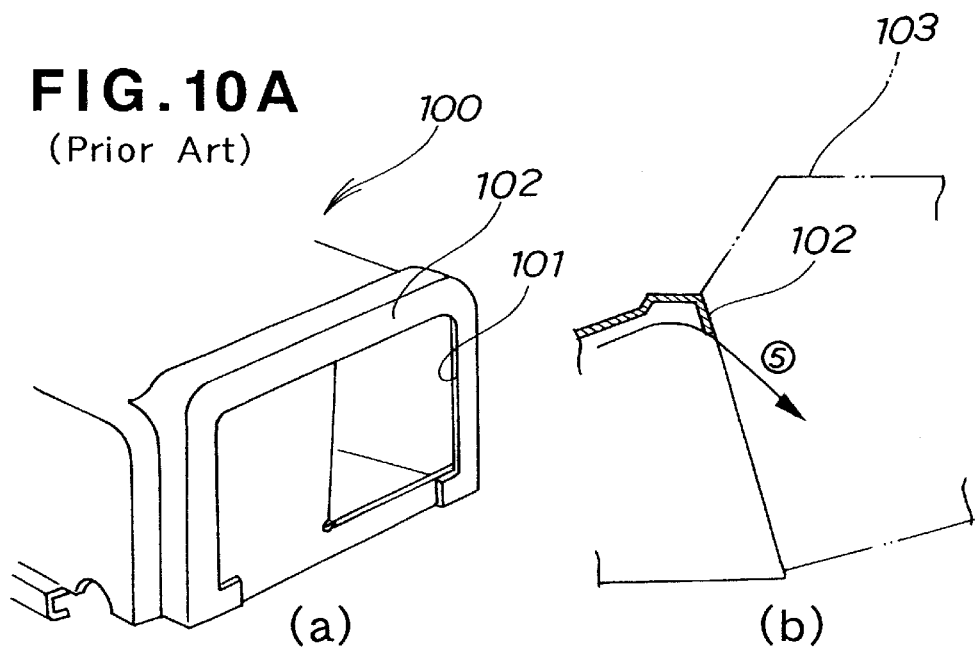
FIG. 10A is a view explanatory of operation of a conventional lawn mower housing structure.

FIG. 10A is a view explanatory of operation of a conventional lawn mower housing 100, and 10B is a view explanatory of operation of the lawn mower housing 11 of the present invention.

As shown in (a) of FIG. 10A, the conventional lawn mower housing 100 includes a cut-grass discharge opening 101, and an open frame portion 102 functioning as a reinforcement for the cut-grass discharge opening 101. In (b) of FIG. 10A, part of the cut grass having flowed rearward over to the cut-grass discharge opening 101 hits a downwardly-projecting upper rear edge of the open frame portion 102 and thus falls down in front of an entrance to grass bag 103, as depicted by arrow ⑤. Thus, the cut grass can not be properly discharged into the grass bag 103, which results in a poor loading efficiency of the grass bag 103.

Figure 10B:
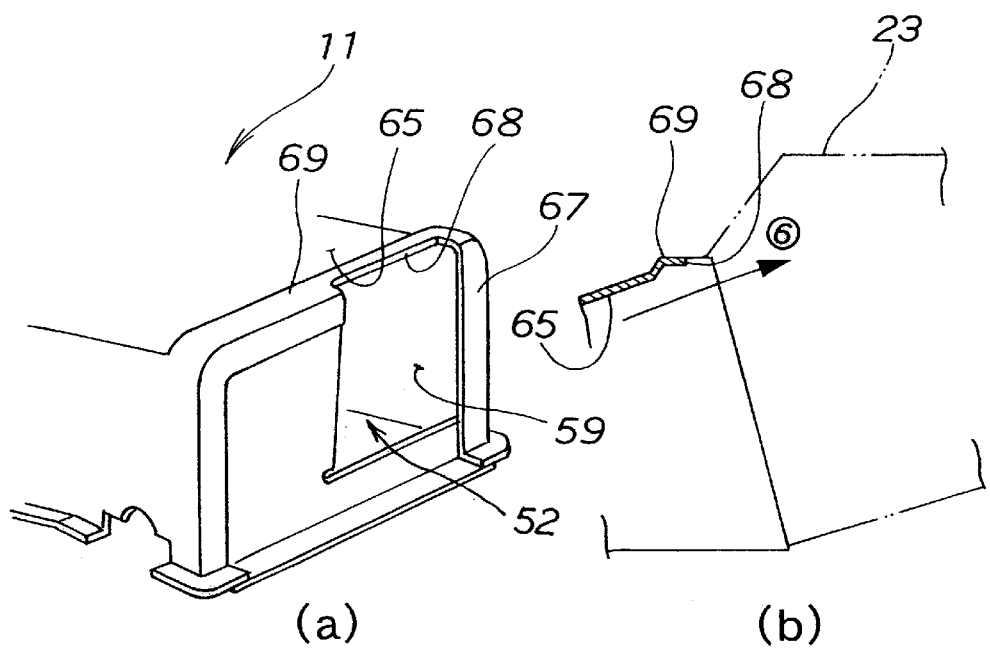
FIG. 10B is a view explanatory of operation of the lawn mower housing structure of the invention.

As seen in (a) of FIG. 10B and as having been set forth above, the inventive lawn mower housing 11 has the upper rear end recess 68 formed by recessing at least the upper rear end edge of a portion of the open frame portion 67, extending as an extension of the ceiling portion 65 of the cut-grass discharge passage 52, in such a manner that the upper rear end recess 68 communicates with the cut-grass discharge opening 42 and hence forms an uppermost open region of the discharge opening 42, and the upper rear edge region of the ceiling portion 65 is formed as the reinforcing bent portion 69 of a dogleg sectional shape in order to reinforce the thus-recessed upper rear edge of the open frame portion 67. By virtue of the upper rear end recess 68, all of the cut grass having flowed rearward over to the cut-grass discharge opening 52 can flow on deep into the grass bag 24 without hitting the upper rear edge of the open frame portion 67. Thus, the cut grass can be properly discharged into the grass bag 24 with an increased loading efficiency.

Whereas the present invention has been described above in relation to the case where the back plate 43 has the locking holes 64 for fitting engagement with the projections of the bottom plate 54, the present invention is not intended to be so limited; for example, the locking holes 64 may be replaced by locking recesses.

Figure 11:
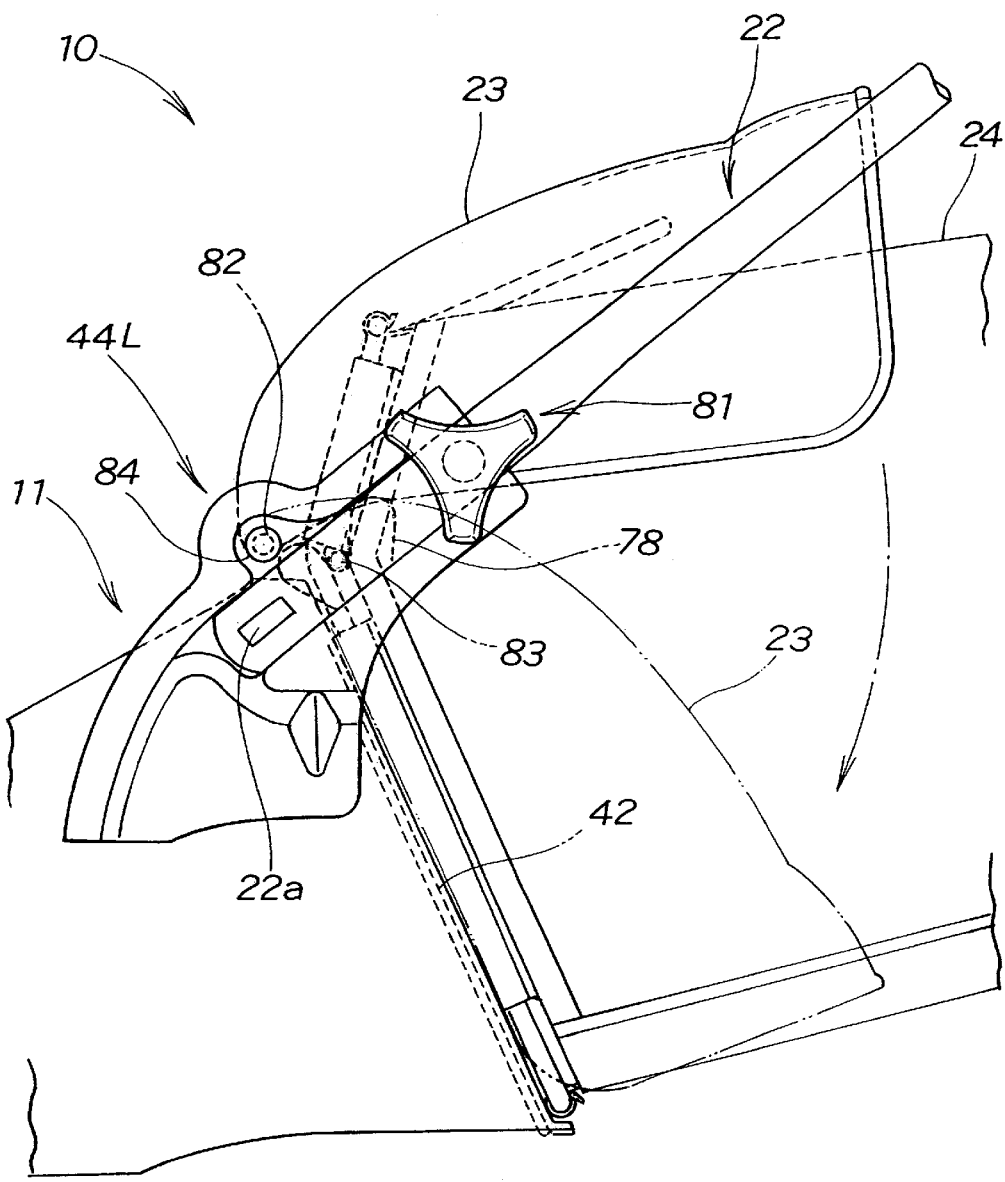
FIG. 11 is a side view of the housing, which particularly shows one of two handle stays and other elements peripheral to the stay.

FIG. 11 is a side view of the housing 11, which particularly shows one of the handle stays (left handle stay 44L) and other elements associated with the handle stay. While the grass bag 24 is attached to the cut-grass discharge opening 42, the housing cover 23 is held in a flipped-up or open position so that the cut grass can be directed into the grass bag 24, but while the grass bag 24 is not attached to the cut-grass discharge opening 42, the housing cover 23 is held in a dependent position so that the cover 23 serves to direct the cut grass onto the ground rather than into the grass bag 24. The handle stays 44L and 44R are metal-made members to which the left and right handle portions of the operating handle 22 are removably attached and which also supports the housing cover 23 and grass bag 24 as will be described hereinbelow. Note that although the following description is made primarily about the left handle stay 44L, it also applies to the right handle stay 44R because the left and right handle stays 44L and 44R are similar in construction.

As further shown in FIG. 11, reference numeral 22a represents a protrusion formed on the left handle portion of the operating handle 22, 81 a screw fastening the left handle portion to the handle stay 44L, 82 a pivot via which the housing cover 23 is pivotably connected to the handle stay 44L, 83 a support shaft via which the grass bag 24 is supported or caught on the handle stay 44L, and 84 represents a fastening ring securing the pivot 82 to the handle stay 44L. The following paragraph describe details of the handle stay 44L.

Figure 12:
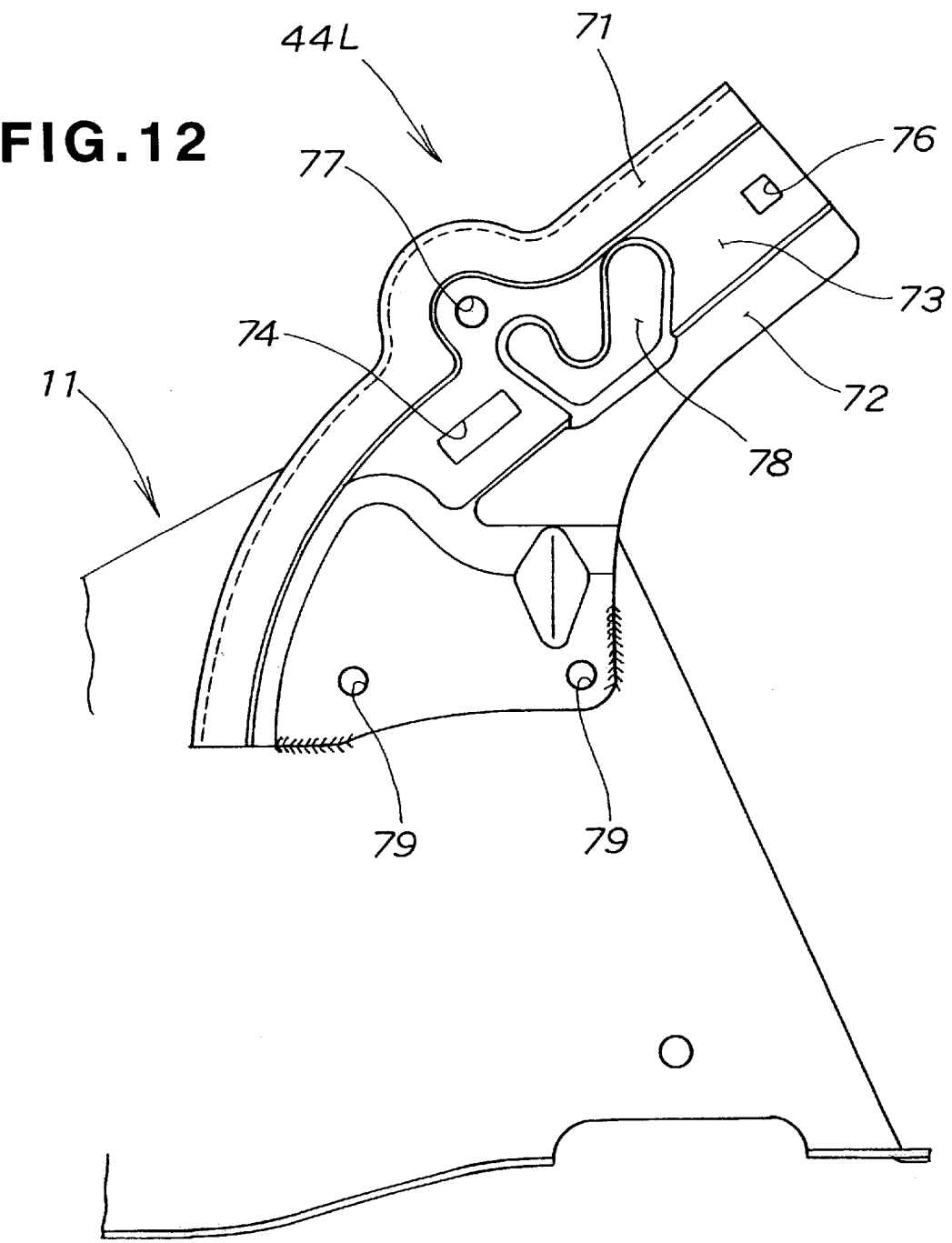
FIG. 12 is a front view of the left handle stay employed in the lawn mower housing structure of the present invention.

FIG. 12 is a front view of the left handle stay 44L employed in the lawn mower housing structure of the present invention. As shown, the left handle stay 44L has upper and lower rib portions 71 and 72 for reinforcement of its mechanical strength, and a middle engagement portion 73 is formed between the upper and lower rib portions 71 and 72 for retaining the left handle portion of the operating handle 22. The middle engagement portion 73 has a rectangular locking hole 74 in which the protrusion 22a on the left handle portion of the operating handle 22 is snugly fitted, and a hole 76 for receiving therein the above-mentioned screw 81 to fasten the left handle portion to the handle stay 44L. The middle engagement portion 73 also has a locking hole 77 function to support the pivot 82 of the housing cover 23 on the middle engagement portion 73, and a V-shaped engagement portion 78 for holding the support shaft 83 of the grass bag 24. Reference numeral 79 represents positioning reference holes to be used for accurately positioning the handle stay 44L during welding operations of the handle stay 44L. Note that the right handle stay 44R and other elements associated therewith (see FIG. 4) are not particularly described here because they are constructed similarly to and arranged symmetrically to the above-described left handle stay 44L and other elements associated therewith.

Figure 13:
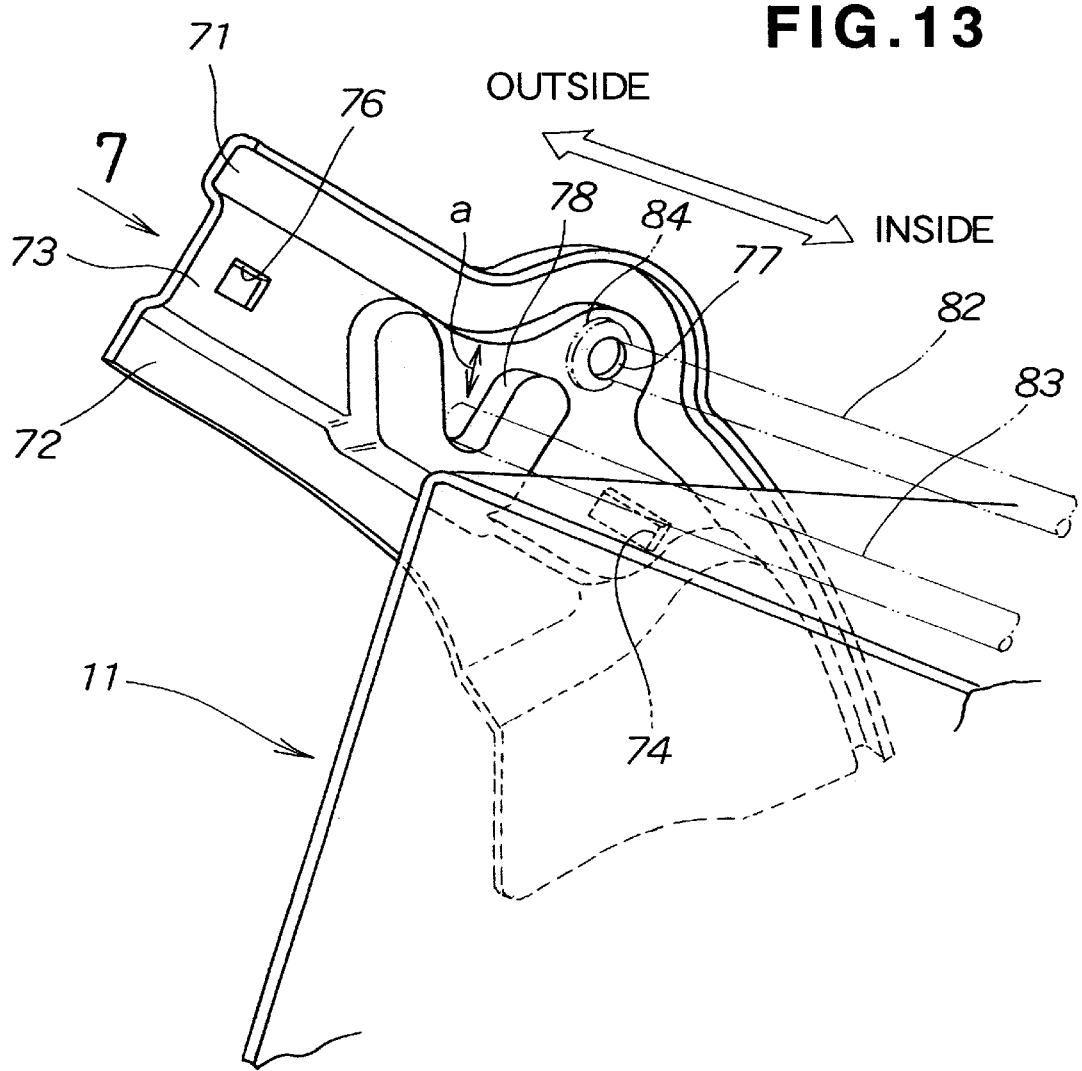
FIG. 13 is a perspective view of the left handle stay 44L employed in the lawn mower housing structure of the invention.

FIG. 13 is a perspective view of the left handle stay 44L employed in the lawn mower housing structure of the invention. Each of the upper and lower rib portions 71 and 72 has a sectional shape protruding outward from the general plane of the stay 44L while the middle engagement portion 73 protrudes inward from the general plane of the stay 44L, as clearly seen from a section of FIG. 13 pointed to by arrow "7".

The V-shaped engagement portion 78, having a middle recess opening upwardly, is formed as a V-shaped inward protrusion. The support shaft 83 of the grass bag 22 (FIG. 11) is engaged or caught in the upwardly-opening middle recess of the engagement portion 78 when the grass bag 22 is attached to the cut-grass discharge opening 42, and the grass bag 22 can be readily detached from the cut-grass discharge opening 42 by just moving the support shaft 83 out of the upwardly-opening middle recess of the engagement portion 78 (see arrow "a"). Further, the pivot 82 of the housing cover 23 is inserted and retained within the locking hole 77 of the handle stay 44L by means of the fastening ring 84, such as an e ring, in such a manner that the housing cover 23 (FIG. 11) is pivotably supported by the handle stay 44L.

As set forth above, the housing 11 includes the left and right handle stays 44L and 44R to which the left and right handle portions of operating handle 22 are removably attached, and each of the left and right handle stays 44L and 44R has the locking hole 77 supporting the pivot 82 of the housing cover 23 and the V-shaped engagement portion 78 via which the grass bag 24 is removably attached to the cut-grass discharge opening 42. Namely, in the inventive lawn mower housing structure, the functions of supporting the operating handle 22, housing cover 23, etc. are centralized on or performed solely by the handle stays 44L and 44R. This centralization of the supporting functions permits significant simplification of the housing structure.

Figure 14A:
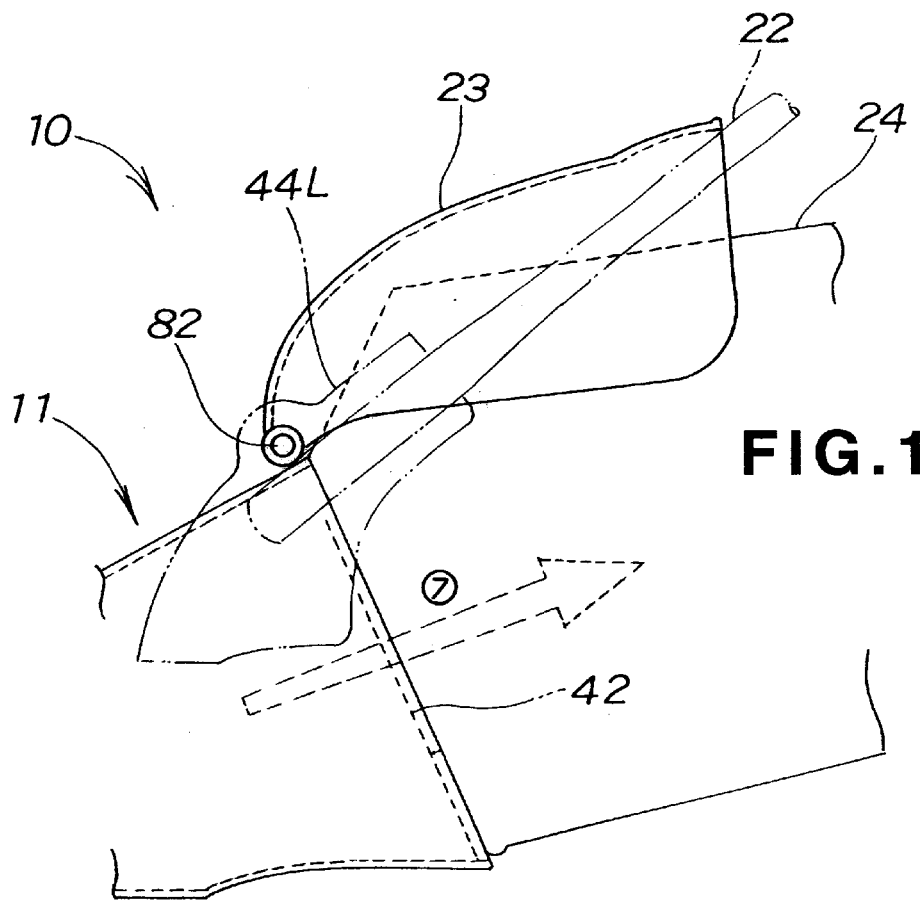
FIGS. 14A and 14B are views explanatory of operation of the lawn mower employing the housing structure of the present invention.
Figure 14B:
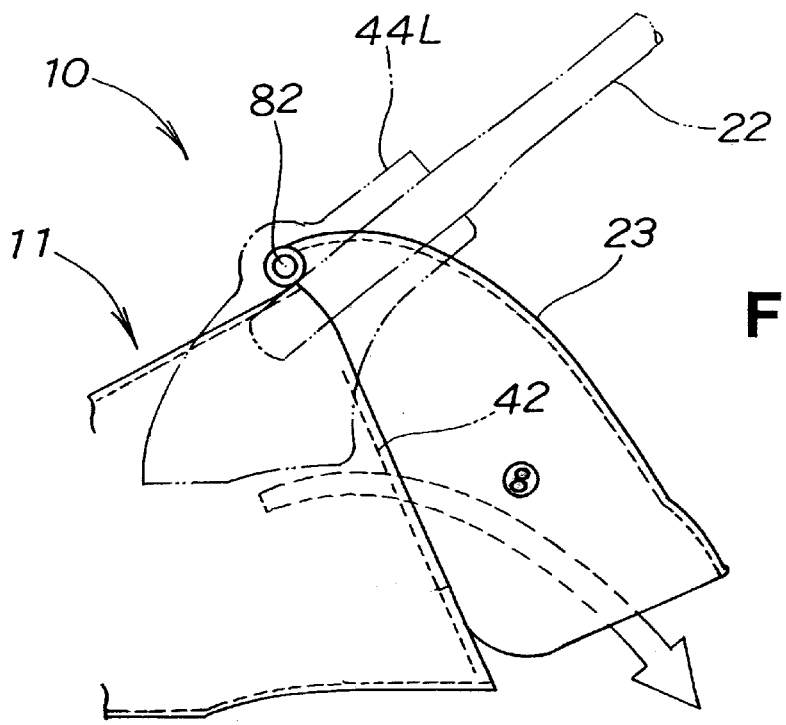

FIGS. 14A and 14B are views explanatory of operation of the lawn mower 10 employing the housing structure of the invention arranged in the above-mentioned manner. As noted above, the lawn mower 10 is of the type including the housing cover 23 that is held in the flipped-up or open position while the grass bag 24 is attached to the cut-grass discharge opening 42 so that the cut grass can be directed into the grass bag 24, but held in the dependent position while the grass bag 24 is not attached to the cut-grass discharge opening 42 so that the cut grass is directed onto the ground rather than into the grass bag 24. Namely, FIG. 14A shows a state in which the housing cover 23 is held in the open position with the grass bag 24 attached to the cut-grass discharge opening 42 and thus the cut grass is discharged into the grass bag 24 as depicted by arrow ⑦. FIG. 14B shows a state in which the housing cover 23 is held in the dependent position with no grass bag attached to the cut-grass discharge opening 42 and thus the cut grass is discharged onto the ground as depicted by arrow ⑧.

Figure 15A:
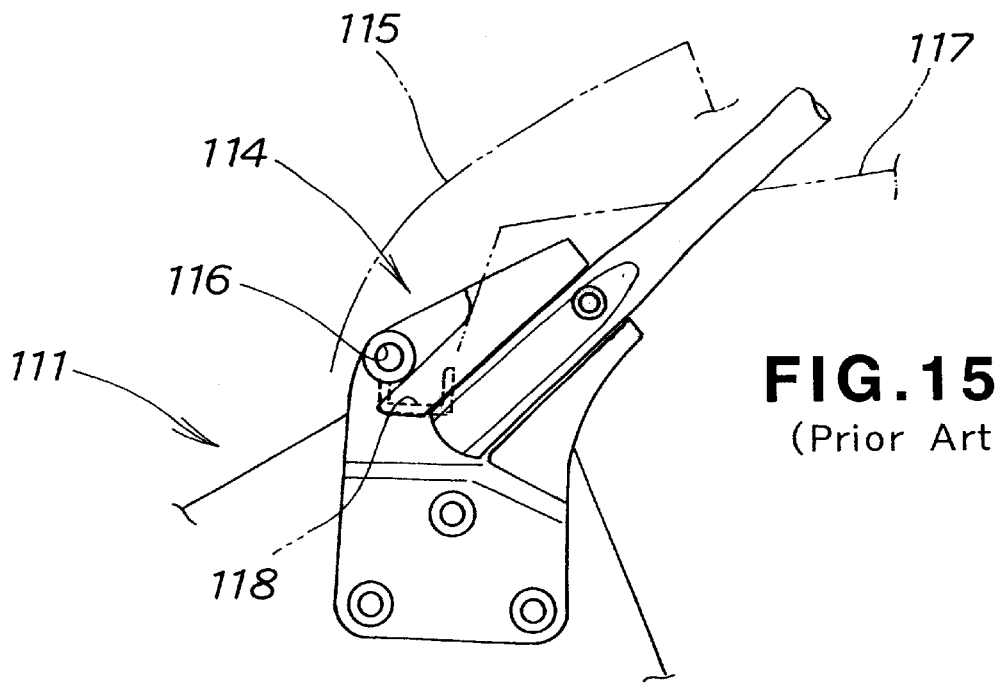
FIG. 15A is a view explanatory of construction of a conventional lawn mower housing structure.
Figure 15B:
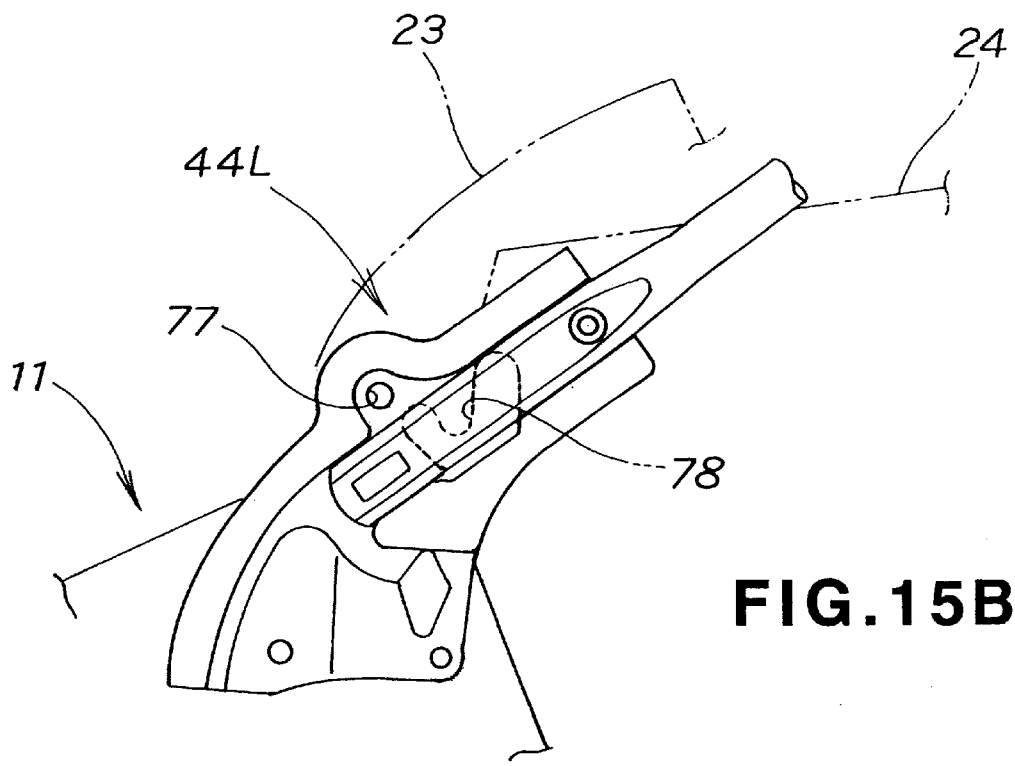
FIG. 15B is a view explanatory of improved construction of the lawn mower housing structure of the invention.

Advantages afforded by the left and handle stays 44L and 44R in the present invention are now explained in relation to FIGS. 15A and 15B. FIG. 15A shows one of handle stays 114 employed in a conventionally-known lawn mower housing structure, while FIG. 15B shows one of the handle stays (left handle stay 41L) employed in the inventive lawn mower housing structure. In the conventionally-known lawn mower housing structure of FIG. 15A, each of the handle stays 114 on the housing 111 has a support section 116 for supporting a housing cover 115, and a discrete grass-bag support member 118 welded thereto for holding a grass bag 117. Thus, the handle stays 114 are each complicated in structure, which would increase the overall cost of the housing 111.

By contrast, each of the handle stays 41L and 44R provided on the housing 11 in the inventive lawn mower housing structure has the locking hole 77 formed therein by a simple stamping press. Thus, the necessary steps for manufacturing the handle stays 41L and 44R can be extremely simplified, as a result of which the cost of the housing 11 can be reduced to a considerable degree. Further, each of the handle stays 41L and 44R on the housing 11 has the V-shaped engagement portion 78 that is also formed thereon by a simple stamping press. Thus, the necessary steps for manufacturing the handle stays 41L and 44R can be simplified even further, which achieves a further reduction in the cost of the housing 11.

Note that the licking hole 77, formed in each of the handle stays 41L and 44R as the housing-cover support section, may be replaced by any other suitable form of opening or cavity.

In summary, the lawn mower housing structure of the present invention is characterized primarily in that the rear scroll guide member or bridge member, having the upper and lower flanges together defining the channel-shaped concave portion for insertion and retention therein of the front end portion of the bottom plate, is provided adjacent and along the horizontal width of the entrance of the cut-grass discharge passage, the back plate having the locking hole is provided adjacent and along the horizontal width of the exit of the cut-grass discharge passage, and there is formed, on the rear end portion of the bottom plate, the projection for fitting engagement with the locking hole of the back plate. In this invention, the bottom plate is secured to the body of the housing with the front end portion inserted in the concave portion of the bridge member and the projection on the rear end portion fitted in the locking hole of the back plate. Such arrangements can effectively facilitate the mounting of the bottom plate and thus can reduce the overall cost of the housing.

Further, the present invention is characterized in that the front end portion of the bottom plate has the depressed surface area for reception therein of the upper flange of the bridge member in such a manner that the upper surface of the upper flange received in the depressed surface area lies flush with the upper surface of the bottom plate other than the depressed surface area. With this arrangement, appropriate and smooth discharge of the cut grass can be achieved.

Furthermore, the present invention is characterized in that the housing has the upper rear end recess formed by recessing at least the upper rear end edge of a portion of the housing extending as an extension of the ceiling portion of the cut-grass discharge passage, and that the upper rear edge region of the ceiling portion adjacent the upper rear end recess is formed as the reinforcing bent portion of a substantially dogleg sectional shape in order to reinforce the thus-recessed upper rear end edge of the housing. With such arrangements, the present invention permits smooth discharge of the cut grass while still maintaining the necessary mechanical strength of the housing.

Obviously, various minor changes and modifications of the present invention are possible in the light of the above teaching. It is therefore to be understood that within the scope of the appended claim, the invention may be practiced otherwise than as specifically described.

What is claimed is:

1. A housing structure for a lawn mower comprising:
   a cut-grass discharge passage for discharging cut grass from a cutter blade housing accommodating a cutter blade, said cut-grass discharge passage having a bottom closed with a discrete bottom plate;
   a bridge member disposed adjacent and along a width of an entrance of said cut-grass discharge passage and having a concave portion for insertion and retention therein of a front end portion of said bottom plate, the concave portion being defined by upper and lower flanges of said bridge member; and
   a back plate disposed adjacent and along a width of an exit of said cut-grass discharge passage and having a locking recess or hole, said bottom plate having, on a rear end portion thereof, a projection for fitting engagement with the locking recess or hole of said back plate,
   wherein said bottom plate is secured to a body of said housing with the front end portion inserted in the concave portion of said bridge member and the projection on the rear end portion fitted in the locking recess or hole of said back plate.

2. A housing structure for a lawn mower as claimed in claim 1 wherein the front end portion of said bottom plate has a depressed surface area for reception therein of the upper flange of said bridge member in such a manner that an upper surface of the upper flange received in the depressed surface area lies flush with an upper surface of said bottom plate other than the depressed surface area.

3. A housing structure for a lawn mower as claimed in claim 1 wherein said housing has an upper rear end recess formed by recessing at least an upper rear end edge of a portion of said housing that extends as an extension of a ceiling portion of said cut-grass discharge passage, and wherein an upper rear edge region of the ceiling portion adjacent the upper rear end recess is formed as a reinforcing bent portion of a dogleg sectional shape in order to reinforce the upper rear end edge of said housing.

\* \* \* \* \*